United States Patent
Norcross

(10) Patent No.: US 6,591,739 B2
(45) Date of Patent: Jul. 15, 2003

(54) TEMPERATURE SENSING UTENSIL WITH DETACHABLE HEADS

(75) Inventor: Charles Norcross, Lakeclark Shores, FL (US)

(73) Assignee: Trucook LLC, West Palm Beach, FL (US)

( * ) Notice: Subject to any disclaimer, the term of this patent is extended or adjusted under 35 U.S.C. 154(b) by 0 days.

(21) Appl. No.: 10/022,587

(22) Filed: Dec. 17, 2001

(65) Prior Publication Data

US 2002/0073853 A1 Jun. 20, 2002

Related U.S. Application Data

(63) Continuation-in-part of application No. 09/521,065, filed on Mar. 8, 2000, now Pat. No. 6,412,398.

(51) Int. Cl.⁷ ............................. A47J 37/00; A47J 43/00
(52) U.S. Cl. ......................... 99/342; 99/419; 374/155; 294/55.5
(58) Field of Search .................. 99/342, 343, 344, 99/421 A, 419; 374/147, 155, 208; 294/49, 55.5, 907

(56) References Cited

U.S. PATENT DOCUMENTS

| | | |
|---|---|---|
| 856,768 A | 6/1907 | Comins |
| 1,249,081 A | 12/1917 | Hastad |
| 1,344,344 A | 6/1920 | Howard |
| 1,779,057 A | 10/1930 | Tolmach |
| 1,863,918 A | 6/1932 | Bremer |
| 2,004,659 A | 6/1935 | Groch ............................ 30/5 |
| 2,040,676 A | 5/1936 | Stevens et al. ................ 53/10 |
| 2,154,426 A | 4/1939 | Adams ........................ 73/352 |
| D123,593 S | 11/1940 | Fischer |
| D162,098 S | 2/1951 | Vacanti |
| 2,594,242 A | 4/1952 | Wilson ...................... 248/278 |
| D168,105 S | 11/1952 | Mitchell et al. ............... D52/7 |
| 2,638,785 A | 5/1953 | Vacanti et al. ................ 73/367 |
| 2,682,705 A | 7/1954 | Johnson ........................ 30/324 |
| 2,787,948 A | 4/1957 | Mathis ......................... 99/421 |
| D182,088 S | 2/1958 | Stiens ........................... D52/7 |
| 2,898,845 A | 8/1959 | Dight ........................... 99/421 |
| 3,060,585 A | 10/1962 | Kirk ............................ 33/143 |
| 3,075,454 A | 1/1963 | Henyan ....................... 99/421 |
| 3,140,611 A | 7/1964 | Kliewer ....................... 73/358 |
| 3,270,661 A | 9/1966 | Juvan .......................... 99/343 |
| D207,270 S | 3/1967 | DiBendetto .................. D44/29 |
| 3,373,611 A | 3/1968 | Trott ........................... 73/352 |
| 3,382,512 A | 5/1968 | Atchley ............................ 7/3 |
| 3,394,593 A | 7/1968 | Aldridge et al. ........... 73/363.9 |
| 3,405,225 A | 10/1968 | McHugh, Jr. ................ 174/52 |
| 3,504,544 A | 4/1970 | Tymkewicz .................. 73/352 |
| 3,552,017 A | 1/1971 | Smuts .......................... 30/322 |
| 3,552,210 A | 1/1971 | Wright, Jr. ................... 73/352 |

(List continued on next page.)

FOREIGN PATENT DOCUMENTS

DE 3636173 5/1988

Primary Examiner—Reginald L. Alexander
(74) Attorney, Agent, or Firm—Greenberg Traurig

(57) ABSTRACT

A temperature sensing utensil including a handle and a plurality of modular, detachable utensil heads. The handle includes an engagement region, having an engagement member moveable between locking and release orientations, a temperature indicating display assembly and a voice synthesizer to convert a temperature signal into audible output. The detachable heads may be selected from a fork head, a spatula head and a probe with a flexible extension member. Each of the detachable heads includes a receiving region having a receiving member and temperature sensing circuitry, as well as a food piercing member for sensing the temperature of food at an internal location thereof. The receiving region releasably receives the engagement region such that positioning of the engagement member in a locking orientation relative to the receiving member locks the detachable head onto the handle, while creating an electrical connection between the temperature sensing circuitry and the temperature indicating display circuitry and voice synthesizer.

33 Claims, 6 Drawing Sheets

U.S. PATENT DOCUMENTS

| | | | |
|---|---|---|---|
| 3,651,405 A | 3/1972 | Whitney et al. | 325/113 |
| D227,294 S | 6/1973 | Maynard | D7/2 |
| 3,736,861 A | 6/1973 | Kroyer et al. | 99/343 |
| 3,742,840 A | 7/1973 | Cogswell | 99/421 |
| D228,337 S | 9/1973 | Maynard | D7/2 |
| 3,778,798 A | 12/1973 | Heit | 340/228 |
| 3,967,502 A | 7/1976 | Moran | 73/352 |
| 4,058,013 A | 11/1977 | Trott | 73/352 |
| 4,083,250 A | 4/1978 | Goff et al. | 73/352 |
| 4,089,222 A | 5/1978 | Perkins | 73/352 |
| 4,156,365 A | 5/1979 | Heinmets et al. | 73/343 |
| 4,182,313 A | 1/1980 | Asian | 128/736 |
| 4,325,187 A | 4/1982 | Wasson | 30/327 |
| D268,333 S | 3/1983 | Kojima et al. | D10/57 |
| 4,428,685 A | 1/1984 | Lemelson et al. | 374/163 |
| 4,479,026 A | 10/1984 | Brixy et al. | 136/232 |
| 4,509,868 A | 4/1985 | Ronconi et al. | 374/141 |
| 4,580,909 A | 4/1986 | McIntosh | 374/141 |
| 4,599,797 A | 7/1986 | Bax | 30/323 |
| 4,601,589 A | 7/1986 | Meisner | 374/208 |
| 4,644,481 A | 2/1987 | Wada | 364/557 |
| 4,667,407 A | 5/1987 | Grise | 30/48 |
| 4,763,112 A | 8/1988 | Hsieh | 340/573 |
| D298,219 S | 10/1988 | Muller | D10/57 |
| 4,813,790 A | 3/1989 | Frankel et al. | 374/208 |
| 4,962,765 A | 10/1990 | Kung et al. | 128/736 |
| RE33,431 E | 11/1990 | Sartori | 15/144 |
| 5,018,875 A | 5/1991 | Cook | 374/208 |
| 5,044,265 A | 9/1991 | Janssen | 99/418 |
| 5,154,114 A | 10/1992 | Chang | 99/340 |
| 5,160,197 A | 11/1992 | Klose | 374/147 |
| 5,213,028 A | 5/1993 | Chang | 99/340 |
| D343,678 S | 1/1994 | Snoke et al. | D24/112 |
| 5,299,356 A | 4/1994 | Maxwell, III | 30/322 |
| 5,349,573 A | 9/1994 | Hiromori | 368/108 |
| 5,399,018 A | 3/1995 | Hollander et al. | 374/121 |
| 5,421,089 A | 6/1995 | Dubus et al. | 30/142 |
| 5,441,344 A | 8/1995 | Cook, III | 374/141 |
| 5,479,708 A | 1/1996 | Thomas | 30/122 |
| 5,575,563 A | 11/1996 | Chiu et al. | 374/141 |
| 5,592,744 A | 1/1997 | Weinstein | 30/324 |
| 5,603,163 A | 2/1997 | Ikner, Jr. | 30/324 |
| 5,620,255 A | 4/1997 | Cook, III | 374/141 |
| 5,626,425 A | 5/1997 | Fujikawa et al. | 374/163 |
| D379,936 S | 6/1997 | Wei-Hsin | D10/57 |
| 5,634,719 A | 6/1997 | La Neve | 374/141 |
| D385,203 S | 10/1997 | Zappa | D10/57 |
| D385,499 S | 10/1997 | Weiss | D10/57 |
| 5,678,925 A | 10/1997 | Garmaise et al. | 374/157 |
| 5,699,614 A | 12/1997 | Garneau, Sr. | 30/142 |
| 5,820,263 A | 10/1998 | Ciobanu | 374/111 |
| 5,829,878 A | 11/1998 | Weiss et al. | 374/163 |
| D405,705 S | 2/1999 | Norcross | D10/57 |
| 5,892,448 A | 4/1999 | Fujikawa et al. | 340/584 |
| D412,126 S | 7/1999 | Aquilina | D10/57 |
| 5,923,258 A | 7/1999 | Tseng | 340/584 |
| 5,924,816 A | 7/1999 | Schuele | 403/371 |
| 5,933,918 A | 8/1999 | Wallays | 16/114 |
| 5,934,181 A | 8/1999 | Adamczewski | 99/342 |
| D416,209 S | 11/1999 | Norcross et al. | D10/57 |
| 6,000,845 A | 12/1999 | Tymkewicz et al. | 374/155 |
| 6,015,232 A | 1/2000 | Hay et al. | 374/138 |
| 6,065,391 A | 5/2000 | Archard et al. | 99/342 |

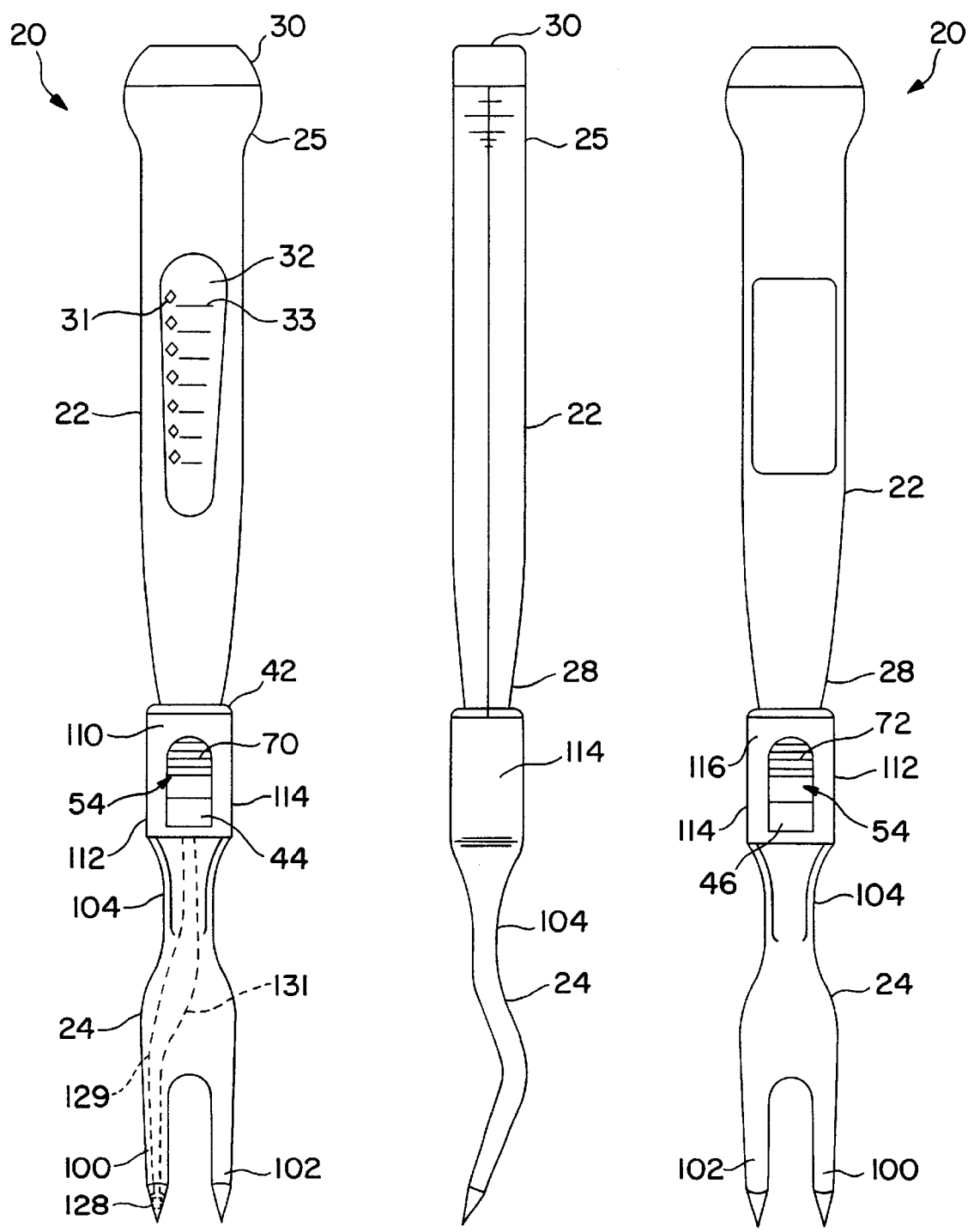

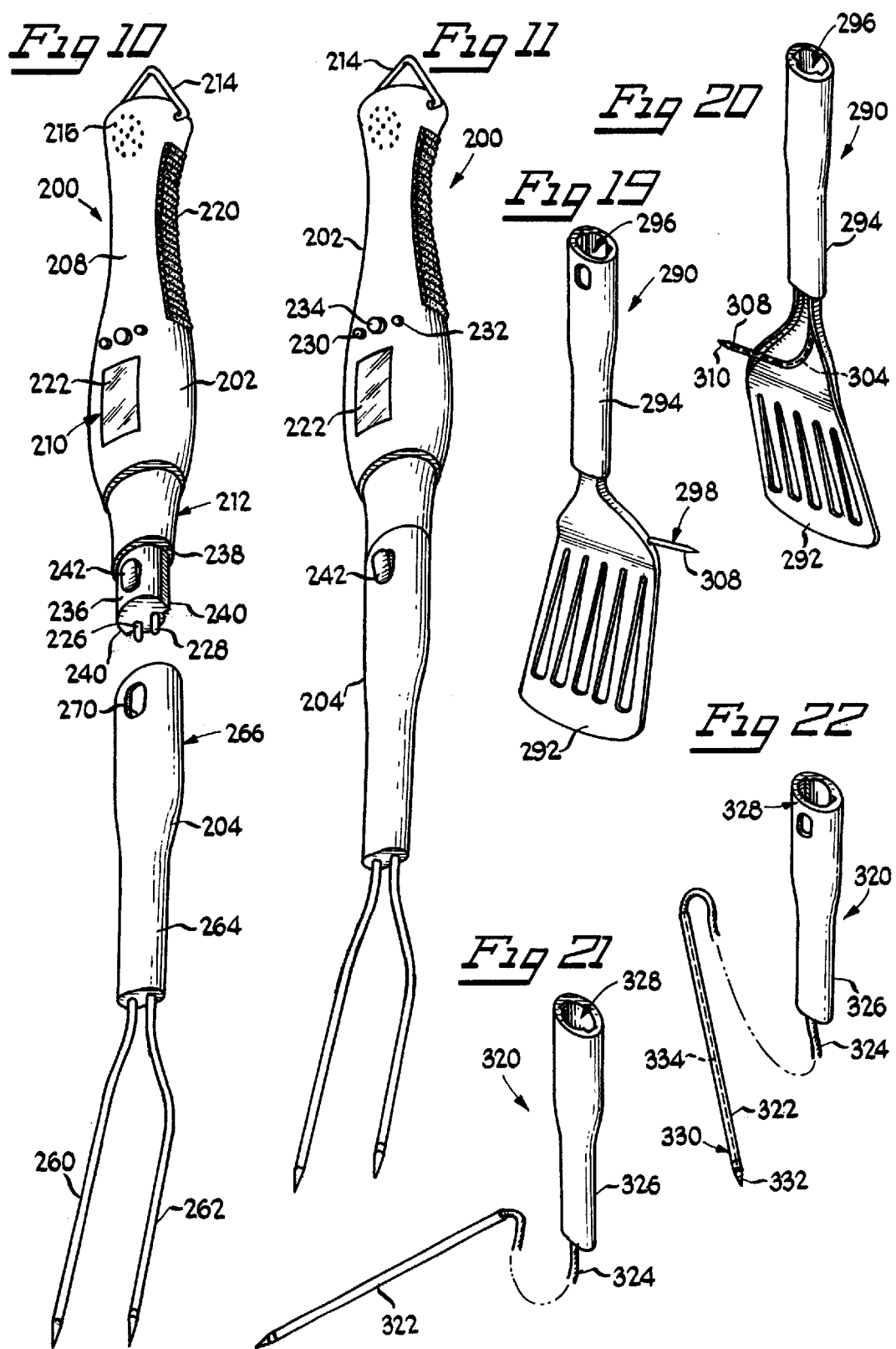

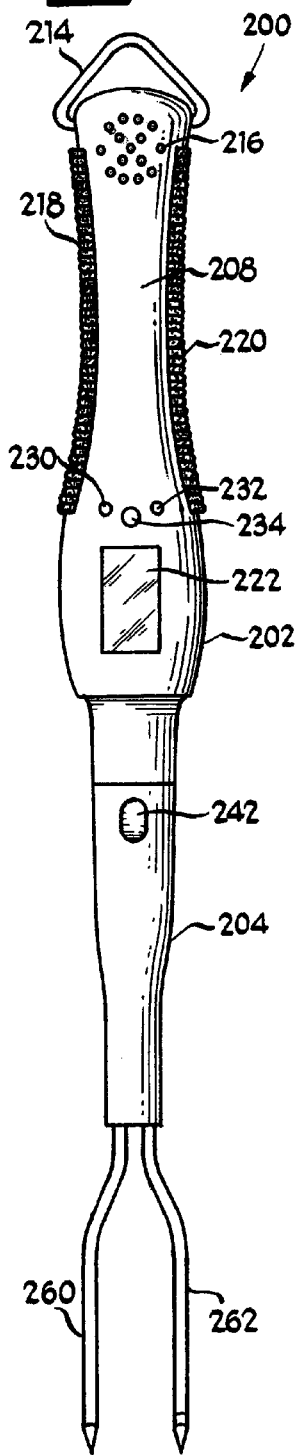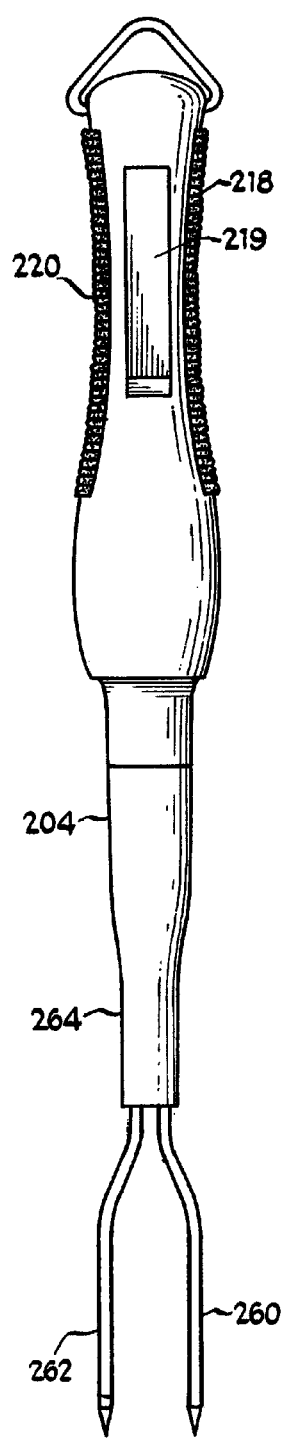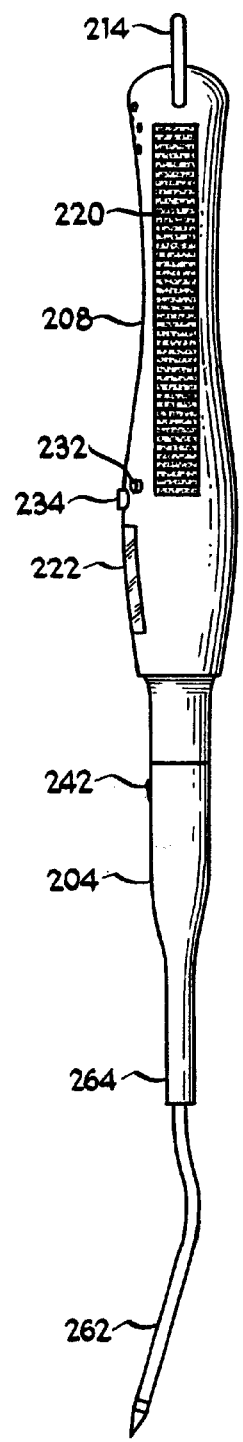

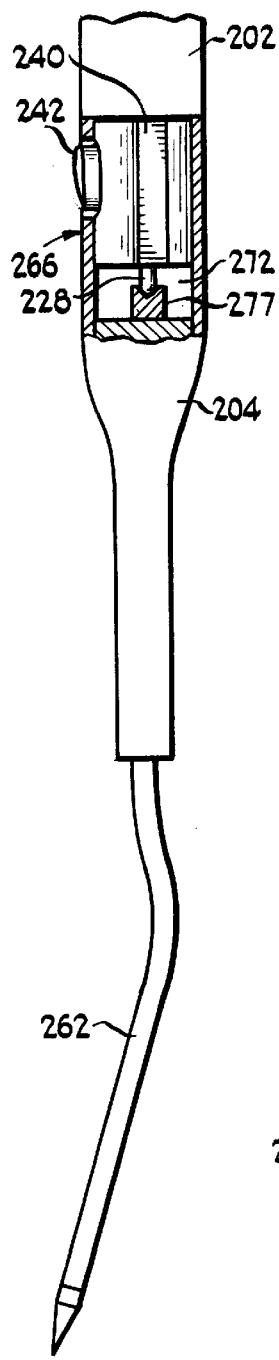
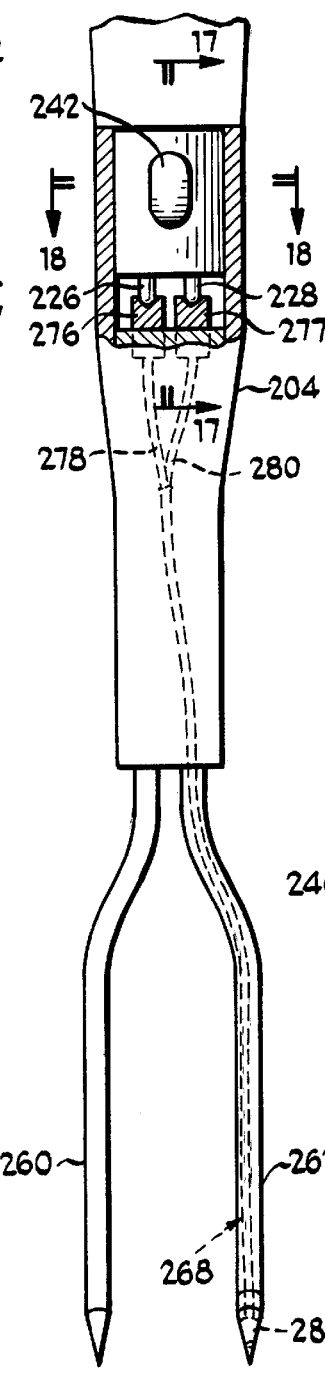
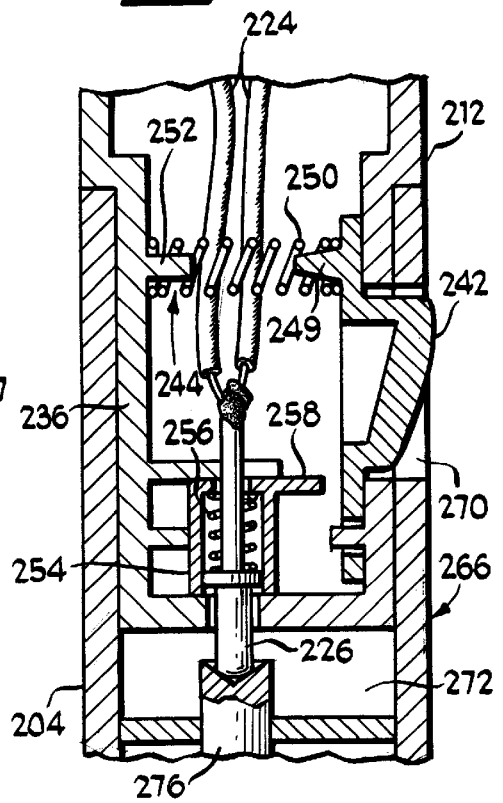
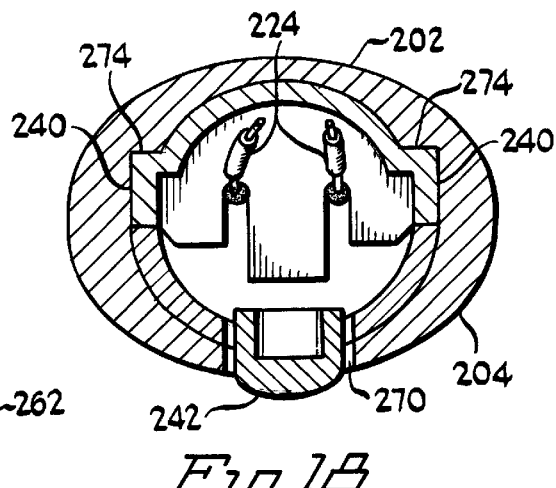

TEMPERATURE SENSING UTENSIL WITH DETACHABLE HEADS

This application is a continuation-in-part of U.S. application Ser. No. 09/521,065, filed Mar. 8, 2000, now U.S. Pat. No. 6,412,398.

BACKGROUND OF THE INVENTION

1. Field of the Invention

The present invention relates in general to temperature sensing utensils for cooking food, and more particularly, to a temperature sensing utensil with modular, interchangeable, detachable heads.

2. Background Art

Cooking utensils and thermometers having detachable and interchangeable heads or implements have been known in the art for several years. In particular, many of these devices include a handle and several heads and/or implements which may be interchangeably attached to and detached from the handle. These devices range in use from kitchen utensils, to utensils for infants, to thermometers. For instance, Thomas, U.S. Pat. No. 5,479,708, discloses a utensil holder for infants and toddlers that is made up of a generally triangular handle and a utensil head. The handle includes a gripping area and a hollow socket which receives a selected utensil head. The utensil head, in turn, includes a tapered shank with a protuberance which fits inside the hollow socket. The hollow socket further includes a depression for receiving the protuberance on the tapered shank. The utensil head, and more particularly, the tapered shank, may be forced into the hollow socket of the handle such that the protuberance fits into the depression in the socket, thus locking the utensil head into place. The utensil head may be forcibly removed from the handle for interchangeability purposes.

While Thomas discloses a handle with a separate detachable utensil head, there is no electrical connection between the detachable utensil head and the handle. Moreover, while the protuberance on the shank of the head and the depression in the hollow socket of the handle facilitates locking of the utensil head to the handle, such an engagement may be disrupted by simply pulling the handle away from the detachable head. A secure lock is not achieved.

Another example, Chiu et al., U.S. Pat. No. 5,575,563, discloses a thermometer having a main body portion capable of accepting a number of different temperature sensing end portions. The main body portion has a receiving region including two female electrical connection sockets, while the sensing end portion has an engaging member including a small detent and two male electrical prongs. The engaging region on the sensing end fits into the receiving region of the main body, and is held in place by the electrical connection between the male prongs and the female receiving sockets, as well as by the mating engagement of the small detent with a depression inside of the handle.

However, to secure the connection between the main body and the sensing end, Chiu et al. relies primarily on the connection of the electrical prongs with the electrical connection ports. While a detent is also disposed on the sensing portion, that detent appears to provide very little locking support, thus allowing inadvertent release of the temperature sensing portion from the main body during use. This fit is especially troublesome in the context of cooking food, wherein the temperature sensing head is ruggedly inserted into and pulled out of various food items. Detachment of the sensing portion or head from the handle can be detrimental in cooking food as detachment of the head from the handle eliminates the electrical connection, and prevents a user from obtaining a proper read-out of food doneness—an undesirable result in cooking meats or other food items which may contain harmful bacteria.

In yet another example, Wallays, U.S. Pat. No. 5,933,918, discloses a kitchen utensil comprising a handle and a series of detachable implements. The handle comprises an inner chamber with a pair a concave seats or recesses, and an inner recessed portion. Each concave seat includes an aperture. The detachable implements each include a mounting portion which comprises a shoulder, a central stem, a head and locking legs. The locking legs further include a protuberance on their respective ends for operable engagement with the apertures in the handle recesses. Further, the locking legs are flexible and may be depressed inwardly to engage and secure the detachable implement into the handle.

Although Wallays discloses a handle with a receiving region which includes apertures to accept specific detents or protuberances on the engaging region of a detachable implement, Wallays does not contemplate an electrical connection. Thus, the engaging and receiving regions of Wallays were not designed to accommodate a secure, tight electrical connection in a cooking utensil with a detachable head which is dishwasher safe. This is particularly evident as the engaging region and depressible detents are positioned on the detachable implement portion. Inasmuch as the depressible detents rely on the resiliency for securing and detaching the detachable implement relative to the handle, repeated hot and cold washing cycles in the dishwasher can render the hard plastic material brittle.

Thus, while these and other prior art devices have presumably worked suitably for their specific applications, none are suited for the present contemplated application. Accordingly, there remains a need for a temperature sensing utensil having a detachable head which is dishwasher safe for removal of potentially harmful bacteria found in meats and other items to be cooked. There remains a further need for temperature sensing utensil with a detachable head which is adapted for use in temperature sensing cooking applications, and wherein the temperature sensing head may be locked to and detached from the temperature indicating handle portion to create an electrical connection. There also remains a need for a temperature sensing utensil having a plurality modular, interchangeable heads, each of which heads have a temperature sensing probe capable of piercing food to be cooked.

These and other desirable characteristics of the present invention will become apparent in light of the present specification (including claims) and drawings.

SUMMARY OF THE INVENTION

The present invention is directed to a temperature sensing utensil including a handle and a plurality of modular, interchangeable, detachable heads.

The handle preferably includes a hand grasping region, a temperature indicating display, a voice synthesizer and an engagement region. The hand grasping region is preferably contoured, and includes at least one tactile gripping surface which creates a grip enhancing region. The grip enhancing region is preferably positioned proximate to but away from the temperature display to allow the temperature display to remain in substantially unobstructed view without altering a user's gripping orientation on the temperature sensing utensil. In one embodiment, the temperature display is positioned below the grip enhancing region on the fork handle.

The engagement region includes an engagement member moveable between locking and release orientations, and a temperature indicating display assembly. In one embodiment, the engagement member comprises a depressible detent operably retained in the engagement region. The detent is preferably maintained in the engagement region by a retention structure, including a spring. The spring biases the detent to an outward locking orientation. The detent is preferably ramp-shaped to facilitate attachment and locking of the detachable head onto the handle.

The temperature indicating display assembly preferably includes a display, a display circuit, electrical conduits, a power source and male electrical connection prongs. The display preferably comprises a digital temperature readout, and may also indicate the doneness of the food being cooked.

The handle also preferably includes a voice synthesizer to produce an audible output, in the form of voice generation or an alarm. The audible output may indicate a temperature or a doneness level and may be produced in a variety of languages, which may be selected by a user.

The plurality of modular, interchangeable, detachable heads preferably include a fork head having two or more tines, a spatula head including a temperature sensing probe and a detachable probe having a flexible extension and a temperature sensing probe. Other heads are likewise contemplated for use with the present invention.

Preferably, each of the modular heads includes a piercing member having a temperature sensing device for insertion into food for sensing the temperature at an internal location thereof. For instance, one tine of the fork head includes a thermocouple to measure the internal temperature of food being cooked.

The spatula head includes a temperature sensing probe extending outwardly from the outer periphery of the spatula portion for insertion into food. The temperature sensing probe preferably extends from the top portion of the spatula, or alternatively from one of the side portions of the spatula, to remain clear of food handling and manipulating operations. In one embodiment, the temperature sensing probe is oriented substantially orthogonally to the spatula portion. In another embodiment, the temperature sensing probe is positioned in a substantially horizontal orientation relative to the substantially vertical orientation of the spatula neck. This permits a user to sense the temperature of food without having to remove or alter the food relative to its cooking environment.

The detachable probe preferably includes a piercing probe connected to a separate neck and receiving region by a flexible extension. The flexible extension may be shut in an oven door or a grill hood. Thus, the probe may remain in food being cooked inside a closed cooking environment, while the receiving region remains outside the closed cooking environment—still enabling the measurement of the temperature of the food.

The plurality of modular, interchangeable, detachable heads each includes a receiving region having a receiving member and temperature sensing circuitry. In one embodiment, the receiving member comprises a window positioned in a wall of the receiving region. The window is preferably of a size and shape to accept the engagement member, in one embodiment of the detent.

The temperature sensing circuitry preferably comprises a temperature sensing member, such as a thermocouple, positioned in one of the food piercing members of the modular heads. The temperature sensing member is preferably connected to electrical connection ports by an electrical conduit. Insertion of the male connecting prongs on the handle into contact with the female ports on the various heads creates an electrical connection between the temperature sensing assembly and the temperature indicating display assembly.

In an embodiment, the engagement region further includes engagement keys, while the receiving region includes engagement slots. The engagement keys and slots ensure that the detachable head is placed onto the handle in a proper mechanical and electrical orientation. In particular, the engagement keys and slots control proper orientation of the receiving region relative to the engagement region, which, in turn, ensures maintenance of the electrical circuit between the temperature sensing assembly and the temperature indicating display assembly, thus preserving uniform polarity.

The receiving region preferably releasably receives the engagement region such that positioning of the engagement member in a locking orientation relative to the receiving member locks the detachable head onto the handle, thus initiating an electrical connection between the temperature sensing circuitry and the temperature indicating display circuitry. However, positioning of the engagement member in a release orientation permits detachment of the head from the handle, and disconnection of the electrical circuit.

BRIEF DESCRIPTION OF THE DRAWINGS

FIG. 3 is a front elevational view of the temperature sensing utensil shown in FIG. 1;

FIG. 4 is a side elevational view of the temperature sensing utensil shown in FIG. 1;

FIG. 5 is a rear elevational view of the temperature sensing utensil shown in FIG. 1;

FIG. 10 is an exploded perspective view of a temperature sensing utensil with a detachable fork head according to another embodiment of the present invention;

FIG. 11 is a perspective view of the temperature sensing utensil shown in FIG. 10 as assembled;

FIG. 12 is a front elevational view of the temperature sensing utensil shown in FIG. 11;

FIG. 13 is a rear elevational view of the temperature sensing utensil shown in FIG. 11;

FIG. 14 is a side elevational view of the temperature sensing utensil shown in FIG. 11;

FIG. 15 is a fragmentary side elevational view shown in partial cross-section of the bottom portion of the temperature sensing utensil shown in FIG. 11;

FIG. 16 is a fragmentary front elevational view shown in partial cross-section of the bottom portion of the temperature sensing utensil shown in FIG. 11;

FIG. 17 is a fragmentary side elevational view shown in cross-section of the temperature sensing utensil taken along lines 17—17 of FIG. 16 and looking in the direction of the arrows;

FIG. 18 is a top plan view shown in cross-section of the temperature sensing utensil taken along lines 18—18 of FIG. 16 and looking in the direction of the arrows;

FIG. 19 is a front perspective view of a modular, detachable spatula head for use with the temperature sensing handle shown in FIG. 10;

FIG. 20 is a rear perspective view of the modular, detachable spatula head shown in FIG. 19;

FIG. 21 is a front perspective view of a modular, detachable temperature sensing probe for use with the temperature sensing utensil handle shown in FIG. 10; and FIG. 22 is a rear perspective view of the modular, detachable temperature sensing probe shown in FIG. 21.

DETAILED DESCRIPTION OF THE INVENTION

Figure 2:
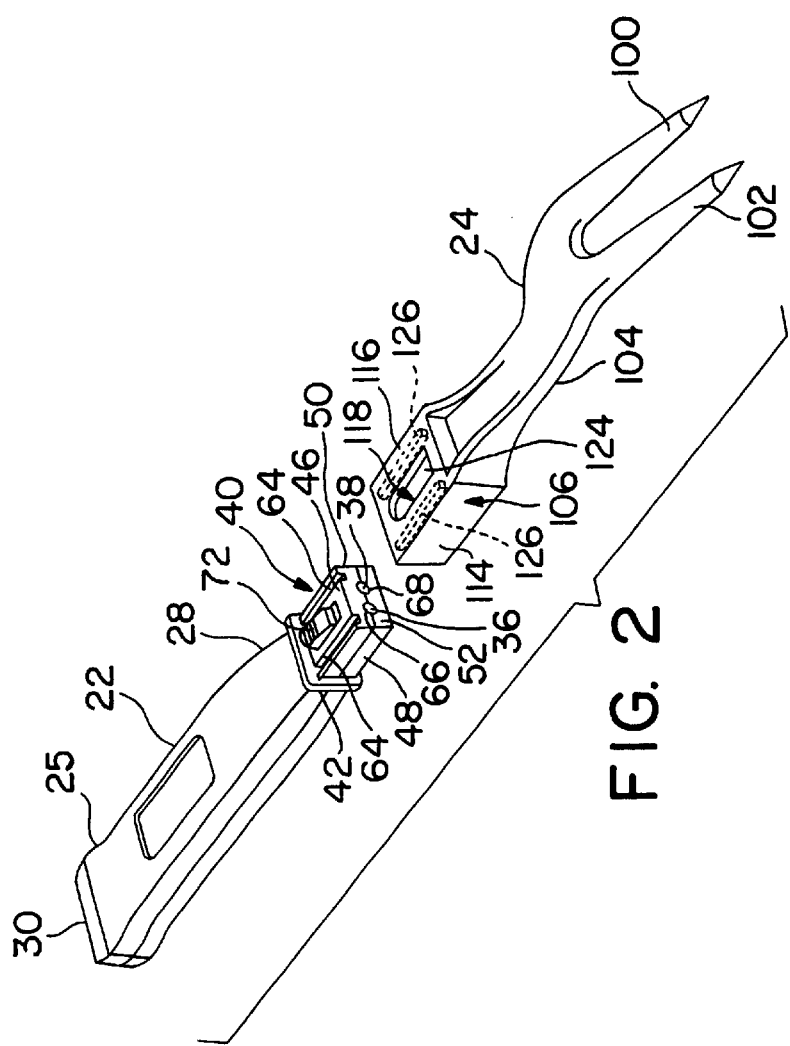
FIG. 2 is an exploded perspective view of the temperature sensing utensil shown in FIG. 1.

While this invention is susceptible of embodiment in many different forms, there are shown in the drawings and will herein be described in detail, two specific embodiments with the understanding that the present disclose is to be considered as an exemplification of the principals of the invention and is not intended to limit the invention to the embodiments illustrated.

Temperature sensing utensil 20 is shown in FIGS. 1–9 as comprising handle 22 and detachable head 24. At the outset, while temperature sensing utensil 20 is shown in the drawings as comprising a temperature sensing fork, it is likewise contemplated that the temperature sensing utensil may comprise any kitchen implement, such as a spoon, knife or other utensil. Alternatively, temperature sensing utensil 20 may comprise other devices which sense the temperature of food. To this end, while detachable head 24 is shown as comprising a fork head including two tines with pointed tips, it is likewise contemplated that detachable head 24 may include a single pointed or piercing tip, or any number of pointed tips. However, for purpose of the present application, temperature sensing utensil 20 will be described in relation to a handle having detachable fork tines. Throughout this detailed description, like reference numerals will be used to designate like parts.

Temperature sensing utensil 20 is preferably constructed from a resilient, hard material such as plastic. Such a construction makes the utensil lightweight and durable. However, it is likewise contemplated that portions, or the entirety, of temperature sensing utensil 20 may be constructed of various metals for increased strength. Further, both handle 22 and head 24 are constructed from two primary pieces which can be attached together chemically, such as by adhesive, or mechanically, such as by screws or the like. Of course, inasmuch as head 24 is detachable from handle 22, the head and handle may be constructed differently. In particular, inasmuch as handle 22 houses the temperature display circuitry, which may need repair or replacing, handle is preferably held together with screws. However, inasmuch as detachable head 24 is preferably dishwasher safe, the head is preferably formed as an integrated single unit—so as so prevent and/or minimize the entry of water or other dishwashing substances into detachable head 24. As will be described below, detachable head 24 includes a temperature sensing assembly, including a thermocouple, which preferably remains dry. Of course, those of ordinary skill in the art with the present disclosure before them will likewise recognize that temperature sensing utensil 20 may be constructed of a single, unitary construction, or, alternatively, may be constructed from yet even additional component pieces.

Handle 22, shown in FIGS. 1–5, includes top end 25, temperature indicating display assembly 26 and bottom end 28. Top end 25 further includes cap 30, which may be removed from handle 22. Handle 22 is preferably hollow, so as to house not only temperature indicating display 26, but also a power source, such as batteries, which powers temperature sensing utensil 20. While not shown in the drawings, batteries are preferably inserted in top 25 of handle 22 after cap 30 is removed.

Figure 1:
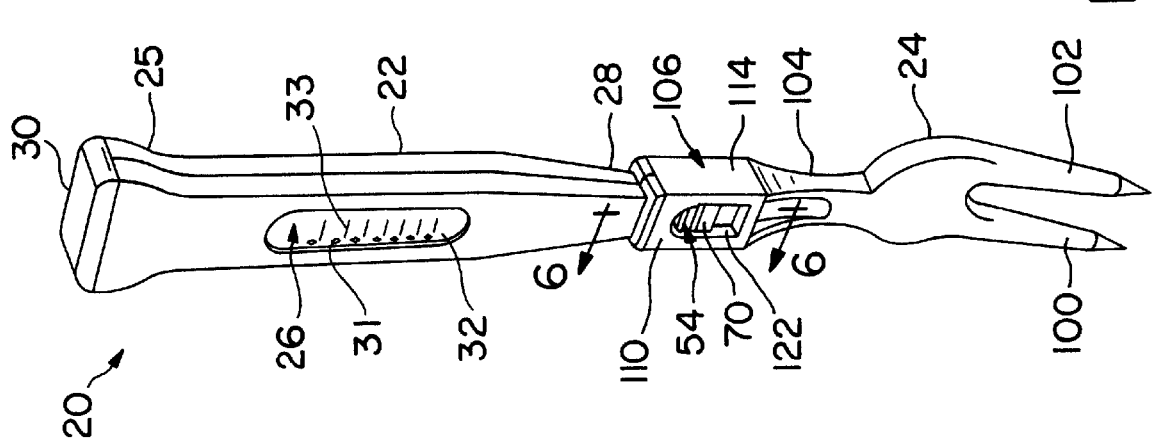
FIG. 1 is a perspective view of a temperature sensing utensil according to the present invention.
Figure 6:
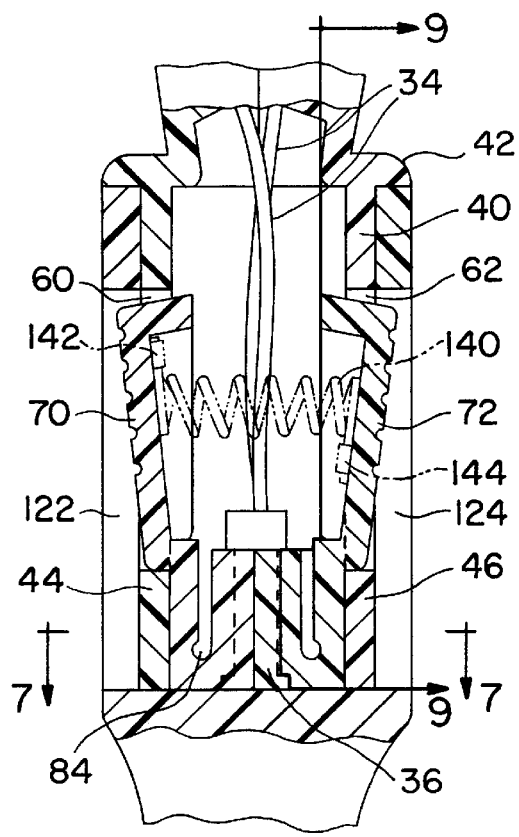
FIG. 6 is a side elevational view shown in cross-section of the temperature sensing utensil taken along lines 6—6 of FIG. 1 and looking in the direction of the arrows.

Temperature indicating display 26 is shown in FIGS. 1, 3 and 6 as including display 32, display circuit (not shown), electrical conduits 34, and electrical connection ports 36 and 38. Display 32 is shown in the drawings as comprising a series of windows 31 which cover LCD displays corresponding to various temperature settings 33, which may vary according to application of temperature sensing utensil 20. For instance, in one application, settings 33 may indicate doneness levels for various meats and other food items, ranging from very rare to well done. Each doneness setting corresponds to a range of food temperatures which are sensed by head 24. However, it is also contemplated that display 32 may comprise a digital temperature display. Likewise, a speaker may be connected to a voice activation module or sound module for audible temperature output.

Figure 7:
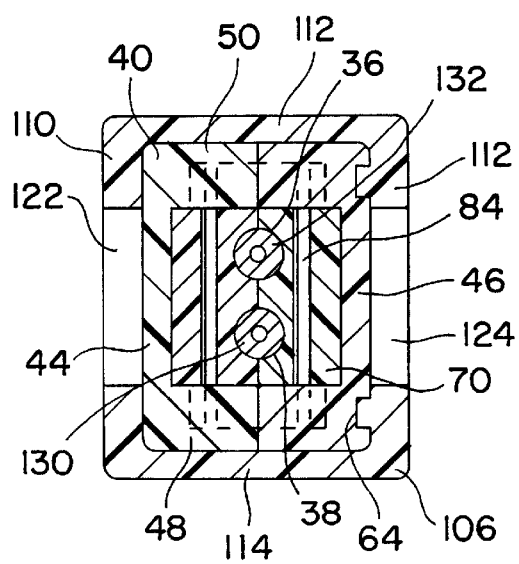
FIG. 7 is a top plan view shown in cross-section of the temperature sensing utensil taken along lines 7—7 of FIG. 6 and looking in the direction of the arrows.

The display circuit preferably converts a signal received from temperature sensing assembly 108 in detachable head 24 to a desired output form for display 32. As is shown in FIGS. 6 and 7 and discussed in more detail below, when electrically connected to male electrical prongs 130 and 132 on head 24, female electrical connection ports 36 and 38 transmit the temperature signal through electrical conduits 34 to the display circuit for conversion to a desired output format.

Bottom end 28 of handle 22 includes engagement region 40, shown in FIGS. 1–9 as comprising shoulder 42, front face 44, back face 46, side faces 48 and 50, bottom face 52, engagement member 54, and inner detent retention structure 56. Shoulder 42 acts as a stop for detachable head 24 when it is attached to engagement region 40 of handle 22. In particular, shoulder 42 ensures proper placement of detachable head 24, and prevents detachable head 24 from exceeding its proper location relative to engagement region 40. Front face 44 and back face 46 include apertures 60 and 62, respectively. As will be described below, apertures 60 and 62 permit movement of engagement member 54, and more particularly detents 70 and 72, between locking and release orientations.

Back face 46 further includes engagement slots 64. Engagement slots 64 are of a dimension to cooperate with engagement keys 126 on receiving region 106 of detachable head 24, as will be described below. Bottom face 52 further includes apertures 66 and 68, which house female electrical connection ports 36 and 38.

Engagement member 54 is shown in FIGS. 1–9 as comprising detents 70 and 72. Inasmuch as detents 70 and 72 are identical components, only detent 70 will be described in detail. Detent 70, shown in FIGS. 6–9, comprises base 74 and contact portion 76. Base 74 includes wings 78 and 79, semi-circular channels 80 and 82, and slot 84. Wings 78 and 79 are configured to fit into inner detent retention structure 56, described below. Moreover, semi-circular channels 80 and 82 combine with the semi-circular channels of detent 72 to form channels which house electrical connection ports 36 and 38. In particular, upon construction of temperature sensing utensil 20, the two opposing handle pieces, preferably substantially mirror images of each other, are secured to form the channels to house female electrical connection ports 36 and 38.

Figure 8:
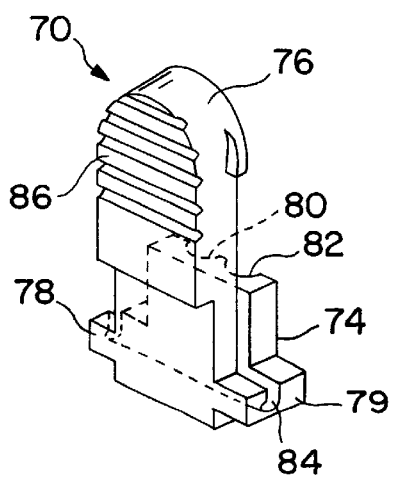
FIG. 8 is a perspective view of a detent segment according to the present invention.

As is shown in FIG. 8, slot 84 separates at least a portion of base 74 from at least a portion of contact portion 76. This separation permits contact portion 76 to move toward and away from base 74. However, inasmuch as contact portion 76 is connected to base 74, contact portion 76 preferably resiliently returns to its original position relative to base 74 after movement toward or away from the base. This resiliency allows contact portion 76 to be moved between locking and release orientations when detents 70 and 72 are placed in inner detent retention structure 56 in engagement region 40. The movement capability of engagement member 54 permits engagement region 40 to be securely locked into receiving region 106 on detachable head 24.

Figure 9:
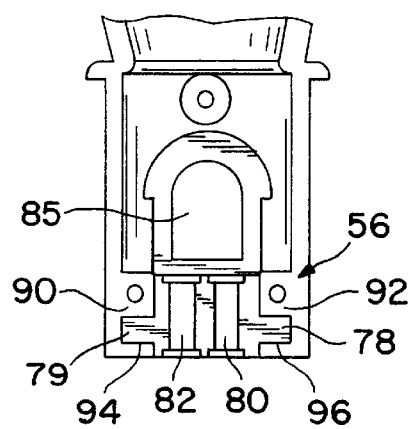
FIG. 9 is a fragmentary front elevational view shown in cross-section of the engagement region of the temperature sensing utensil taken along lines 9—9 of FIG. 1 and looking in the direction of the arrows.

As can be seen in FIGS. 8 and 9, contact portion 76 preferably includes a hollow portion 85 and contact face 86. Contact face 86, in turn, preferably includes a gripping surface, shown in the figures as a series of ridges and grooves, to help a user feel when he or she has contacted detents 70 and 72, as well as to facilitate movement of detents 70 and 72 between locking and release orientations. Inasmuch as temperature sensing utensil 20 is often used outside on a barbecue grill at night time and/or in the dark, the tactile gripping surface allows a user to blindly detach and reattach detachable head onto the handle 22. Moreover, while contact face 86 is as shown as including ridges and grooves, other gripping surfaces such as depressions, dimples, protruburances, etc. are likewise contemplated for use in the present invention.

Inner detent retention structure 56, shown in FIG. 9, includes opposing shoulders 90 and 92, and wing slots 94 and 96. Wing slots 94 and 96 accept wings 78 and 79 on detent base 74, for a secured friction fit of detents 70 and 72 in inner detent retention structure 56. While an adhesive or chemical compound may be used to permanently secure detents 70 and 72 in inner retention structure 56, a friction fit is preferred to allow disassembly of temperature sensing utensil 20 and replacement of detents 70 and 72, if necessary. Notably, each half of handle engagement region 40 includes an inner detent retention structure, so as to house both detents 70 and 72.

Moreover, contact portion 76 of detents 70 and 72 is preferably ramped or angled from bottom to top so as to protrude from front and back face apertures 60 and 62, respectively, when the detents are positioned in engagement region 40. Such a construction allows a user to better feel the upper ramped portion of contact portion 76 through receiving region windows 122 and 124, as is described below. More importantly, a ramped detent structure securely locks detachable head 24 onto engagement region 40 of handle 22, while at the same time facilitating placement of detachable head 24 onto handle 22, also described below.

Inasmuch as detent segments 70 and 72 are preferably brought into contact when temperature sensing utensil handle 22 is constructed, detents 70 and 72 are locked into place at least partially inside engagement region 40. Secured in engagement region 40, the respective base portions of detents 70 and 72 are substantially locked into place. However, despite the substantial locking of the base portions, slots 84 permit the respective contact portions of detents 70 and 72 to move relative to the base portions in and out of apertures 60 and 62 in front 44 and back 46 faces of engagement region 40.

Detachable head 24 is shown in FIGS. 1–7 as comprising tines 100 and 102, neck 104, receiving region 106 and temperature sensing assembly 108. Tines 100 and 102 preferably include food piercing tips for penetration into food and subsequent temperature measurements. As is shown in phantom in FIG. 3, one of the tines includes a temperature sensing thermocouple 128 with leads 129 and 131 extending therefrom, for measuring the temperature of food.

Receiving region 106 comprises front wall 110, opposing sidewalls 112 and 114, back wall 116, retaining region 118 and floor 120. Both front wall 110 and back wall 116 include windows 122 and 124, respectively, for receiving engagement member 54 on engagement region 40. Specifically, when engagement region 40 comprises detents 70 and 72, windows 122 and 124 each accept a detent for securing and locking detachable head 24 to handle 22.

Back wall 116 further includes engagement keys 126 positioned on the inner face of the back wall. Keys 126 preferable slide within engagement slots 64 in engagement region 40. The mating engagement of keys 126 with slots 64 helps to not only prevent rotational or lateral movement of detachable head 24 relative to handle 22 when in a secured, locking orientation, but also to assure a user that detachable head 24 is oriented properly relative to handle 22. Proper orientation of detachable head 24 on handle 22 is essential to ensure electrical connection between temperature sensing assembly 108 in detachable head 24 to temperature indicating display assembly 26 in handle 22. In particular, the correct male electrical prong 130 or 132 must be placed within the proper female electrical connection port 36 and 38 to ensure proper electric polarity. Moreover, as discussed, the temperature sensing utensil of the present invention is often used in the dark when barbecuing outdoors. Engagement keys 126 prevent detachable head 24 from being place on handle 22 in an improper electrical orientation. Thus, a user is precluded from attempting to use the fork in an electrically non-operative orientation, in turn precluding an improper or unresponsive reading on the temperature display for cooking purposes.

Temperature sensing assembly 108 comprises thermocouple 128, leads 129 and 131, and male electrical prongs 130 and 132. Thermocouple 128, shown in phantom in FIG. 3, is preferably positioned in right hand tine 100. However, it is likewise contemplated that thermocouple may be placed in left hand tine 102, or in any other tine if additional tines are used. Thermocouple 128 senses the temperature of a food item upon insertion of tines 100 and 102 into that item. A sensed temperature signal is transmitted from thermocouple 128, through leads 129 and 131, to male electrical connecting prongs 130 and 132, which preferably emanate from floor 120 of receiving region 106. As described above, prongs 130 and 132 fit into electrical connection ports 36 and 38 in engagement region 40. Preferably, the seal between prongs 130 and 132 and floor 120 is water tight, so as to prevent seepage or leakage of water into detachable head 24 during dishwashing or other cleaning. Such entry of water into detachable head may adversely affect performance and/or accuracy of thermocouple 128, as well as the accuracy of the general temperature sensing mechanism employed by the present invention.

As is shown in FIG. 6, detents 70 and 72 may likewise be biased outwardly in a locking orientation by spring 140. Spring 140 preferably extends between the inner surfaces of detents 70 and 72, preferably in the hollow portion 85 of each detent. While springs are shown as held in place by retaining structures 142 and 144, any retaining structure may likewise be used in combination with the detents 70 and 72 as would be known by those of ordinary skill in the art with the present disclosure before them. For instance, detents 70 and 72 may be equipped with sockets on their inside faces to receive spring 140. Of course, spring 140 may be used either alone or in combination with the existing detent structure.

Notably, in this particular embodiment, spring 140 and engagement region 40 are associated with handle 22. In particular, handle 22 cannot be subjected to dishwasher cleaning because of the temperature indicating display circuitry contained therein, including a power source preferably in the form of batteries. Simply stated, water may short the temperature indicating display circuit. Thus, spring 140 is preferably positioned in the portion of temperature sensing utensil 20 which is not intended for cleaning in a dishwasher. Indeed, subjecting spring 140 to the continual heating and cooling cycles in a dishwasher, rusts, erodes and weakens the spring, thus rendering the spring less effective or even non-functional.

To assemble temperature sensing utensil 20, receiving region 106 of detachable head 24 is positioned over engagement region 40 of handle 22. Notably, a proper electrical connection between the detachable head and the handle is ensured as receiving region 106 will not slide over engagement region 40 if engagement keys 126 on the inner surface of back wall 116 of receiving region 106 are not aligned with engagement slots 64 in back face 46 of engagement region 40. Because contact portions 76 of detents 70 and 72 are preferably ramped or sloped, receiving region 106 simply depresses engagement member 54, namely, detents 70 and 72, downward against the detent bias to a release orientation. Inasmuch as detents 70 and 72 each include slot 84, thus lending resiliency to the detents, detent contact portions 76 may be depressed toward detent base portions 74 while maintaining the integrity and structure of the detents— without breaking or substantially weakening same. Of course, if spring 140 is used, detents are simply depressed toward one another against the spring bias toward a release orientation.

When receiving region 106 abuts shoulder 42 of engagement region 40, detents 70 and 72 preferably align with windows 122 and 124 in receiving region 106. At this point in time, detents 70 and 72 return back to their original locking orientation, as they are biased to the locking orientation by either the resiliency of the detent material, a spring placed between the detents and/or other biasing mechanism. In the locking orientation, detents 70 and 72 preclude detachment of detachable head 24 from handle 22, thus locking detachable head 24 onto handle 22 for use of temperature sensing utensil 20. In particular, the upper ramped portion of the detent contact portions 76 abut the inside face of the portion of receiving region 106 defining windows 122 and 124, thus precluding movement of the receiving region relative to the engagement region. Of course, in this locking orientation, male electrical connecting prongs 130 and 132 are inserted into female electrical connection ports 36 and 38 to electrically connect temperature sensing assembly 108 in detachable head 24 to temperature indicating display assembly 26 in handle 22.

To detach head 24 from handle 22, engagement member 54, and more particularly detents 70 and 72, are depressed against their outward locking orientation bias toward a release orientation, thus permitting a user to pull receiving region 106 off of engagement region 40. Detachable head 24, upon detachment from handle 22, may be cleansed in a dishwasher to destroy any bacteria from food contacted by tines 100 and 102. Inasmuch as the engagement region 40 is positioned on handle 22, engagement member 54, and more particularly detents 70 and 72, are never subjected to the hot and cold cycles of dishwasher cleaning which may render the preferably plastic detents brittle and weak—thus destroying the ability of the detents to freely move between locking and release orientations. Indeed, repeated dishwashing may even result in breaking of the detents during attachment of head 24 to and detachment of head 24 from handle 22.

Moreover the engagement structure contemplated by the present invention permits easy attachment of detachable head 24 to handle 22 without the exertion of substantial force. Further, when attached, detachable head 24 is securely locked on handle 22, with no opportunity to release during use. At the same time, engagement member 54 permits detachable head 24 to be released from handle 22 without the exertion of substantial force, provided that engagement member is moved to the release orientation.

In another embodiment, shown in FIGS. 10–18, temperature sensing utensil 200 comprises handle 202 and detachable fork head 204. Handle 202 includes top end 206, hand grasping region 208, temperature indicating display assembly 210 and bottom end 212. As can be seen from FIGS. 10–14, top end 206 of handle 202 includes hanging piece 214 and speaker 216. Hanging piece 214 allows temperature sensing utensil to be stored in any convenient, hanging manner, such as from a nail or other hook in a kitchen, on a grill or in any other convenient location. Likewise, while hanging piece 214 is shown as substantially triangular in configuration, hanging piece may take any configuration, including circular, square, rectangular, etc.

Speaker 216 is preferably housed within top end 206 of handle 202, and is connected to a voice synthesizer, not shown in the drawings. The voice synthesizer provides an audible output corresponding to a temperature reading by temperature sensing utensil 200. The audible output may take the form of a simple beeping sound or alarm when certain temperature ranges or limits are reached, or of an actual human voice which indicates an exact food temperature, a particular doneness level and/or other useful temperature related information. As will be discussed below, the voice synthesizer is connected to the temperature sensing assembly circuit to enable temperature sensing utensil 200 to provide a user with audible feedback.

Hand grasping region 208, shown in FIGS. 10–14, includes the contoured, thinner part of handle 202. Hand grasping region 208 is appropriately contoured to match the contour and/or grip of a user's hand, thereby ensuring a comfortable and ergonomically friendly grip. Moreover, hand grasping region 208 preferably also includes tactile gripping surfaces 218 and 220 to create a grip enhancing region. Those gripping surfaces are preferably a different material, such as a pliable and soft rubber, than the remainder of handle 202, which is preferably constructed from a hard plastic, to provide a user with an enhanced feel and grip of the fork. Moreover, the different material of tactile gripping surfaces 218 and 220 allows the user to find the right gripping location when using the temperature sensing utensil in the dark or in environments having limited light.

Hand grasping region 208 also serves to direct a user's hand away from the temperature indicating display assembly 210, so as to keep the temperature indicating display assembly, and more particularly display 222, in clear view during use of the utensil. Additionally, it is likewise preferred that temperature indicating display assembly 210 is positioned on handle 202 proximate hand grasping region 208 to provide accessibility and manipulability by a user, without the need to change or move the user's grip on utensil 200. Hand grasping region 208 also preferably includes a battery housing cover 219, shown in FIG. 13, to house batteries which power the utensil.

Temperature indicating display assembly 210 is shown in FIGS. 10–18 as comprising display 222, electrical connectors 224, electrical connection prongs 226 and 228, temperature output selection button 230, language selection button 232 and speaker selection button 234. Display 222 is preferably a digital display, having an LCD screen covered by a plastic window. However, other displays, such as a graduated or analog display, are likewise contemplated. Display 222 may indicate the temperature of a piece of food being cooked, the doneness level of that piece of food (such as rare, medium rare, medium, medium well, well, etc.) or both.

Electrical connectors 224, shown in FIG. 17, extend from electrical connection prongs 226 and 228 to a circuit (not shown) for processing a signal received from the temperature sensing assembly 268 in detachable fork head 204, discussed below. The temperature output make take the form of an actual temperature reading, a corresponding visual doneness indication, or an audible output via the voice synthesizer. Temperature output selection button 230 allows user to toggle between temperature output in degrees Celsius and degrees Fahrenheit, while the language selection button 232 preferably allows the user to toggle between various languages, such as English, French and Spanish, for both text output and audible output. Speaker selection button 234 allows a user to turn the voice synthesizer on and off, as preferred by a particular user of temperature sensing utensil 200.

Bottom end 212 of handle 202, shown in FIGS. 10–18, includes engagement region 236 which, in turn, includes shoulder 238, keyed regions 240, engagement member 242, engagement member retention structure 244 and electrical connection prong housing 246. Shoulder 238, shown in FIG. 10, acts as a stop when detachable fork head 204 is positioned onto engagement region 236 of handle 202. Shoulder 238 prevents detachable fork head 204 from sliding too far on handle 202, while also ensuring alignment of engagement region 236 on handle 202 with receiving region 266 on detachable fork head 204.

Keyed regions 240, shown in FIGS. 10, 15 and 18, are formed in engagement region 236 to render the cross-sectional shape of engagement region 236 non-uniform. Keyed regions 240 preferably match grooves 274 in receiving region 266 of detachable fork head 204, as will be described in additional detail below. This relationship ensures that detachable fork head 204 is attachable to handle 202 in only one orientation, to ensure proper electrical connectivity and polarity. Moreover, while keyed regions 240 are shown as including substantially right angled or squared off corners, the keyed regions may comprise any number of shapes or designs which allow a specific engagement orientation of the detachable fork head to the handle.

Engagement member 242 is shown in FIGS. 10–12 and 14–18 as comprising a depressible detent. As can be seen from FIG. 17, engagement member 242 preferably has a sloped or ramped shape to allow receiving region 266 of detachable fork head 204 to be positioned over engagement member 242 and engagement region 236 with relative ease—to ultimately lock engagement member 242 in aperture 270 of receiving region 266. Further, engagement member 242 also preferably includes ridges, shown in FIG. 17, to identify the engagement member to a user by feel, and a truncated cone shaped piece 249 extending into the interior of the engagement region from its top end.

As is also shown in FIG. 17, engagement member 242 is housed in engagement member retention structure 244, which includes spring 250 and rod 252. Spring 250 fits over truncated cone shaped piece 249 on engagement member 242 at one end, and over rod 252 at the other end. Spring 250 provides the necessary resistance and tension to maintain engagement member 242 in engagement region 236. Likewise, spring 250 provides resistance to a user when depressing engagement member 242. Thus, when detachable fork head 204 is locked onto handle 202, engagement member 242 protrudes past aperture 270 and receiving region 266, shown in FIGS. 17 and 18, to maintain a secure, yet releasable connection of detachable fork head 204 to handle 202. Of course, engagement member 242 may be constructed in any number of ways, with or without engagement member retention structure 244, to facilitate releasable locking of detachable fork head 204 onto engagement region 236 of handle 202, as would be known by those with ordinary skill in the art with the present disclosure before them.

Electrical connection prong housing 246, shown in FIGS. 15–18, includes chamber 254, springs 256 and extension 258. As can be seen from FIG. 17, chamber 254 houses spring 256, which provides a tensioning resistance force to bias electrical connection prong 226 toward electrical connection port 276. This tensioning force ensures that electrical connection prongs 226 and 228 are maintained in firm contact with electrical ports 276 and 277. At the same time, the springs allow for minor degrees of variation between the various detachable utensil heads, as electrical connection prongs 226 and 228 move freely up and down in the vertical housings defined by chambers 254—to allow for variations in the positioning and/or size of the electrical ports in the detachable utensil heads. Extension 258 preferably extends from one side of chamber 254 to maintain the bottom end of engagement member 242 in engagement region 236. Thus, extension member 258 helps maintain the positioning of engagement member 242 in engagement region 236 during depression and release of the engagement member by a user.

Detachable fork head 204, shown in FIGS. 10–18, includes tines 260 and 262, neck 264, receiving region 266 and temperature sensing assembly 268. Receiving region 266 includes aperture 270, cavity 272 and grooves 274. Aperture 270 is preferably of a size and configuration to accept engagement member 242, while cavity 272 is preferably of a size and dimension to house engagement region 236. Accordingly, when detachable fork head 204 is positioned onto handle 202, engagement region 236 enters cavity 272 of receiving region 266, and aperture 270 slides over and is eventually positioned around engagement member 242. A portion of engagement member 242 preferably protrudes through aperture 270 to releasably lock detachable fork head 204 relative to handle 202. Likewise, grooves 274 are preferably configured to mate with keyed regions 240, as described above.

Temperature sensing assembly 268 is shown in FIGS. 15–18 as comprising electrical ports 276 and 277, leads 278 and 280, and thermocouple 282. Electrical ports 276 and 277 are preferably configured to receive electrical connection prongs 226 and 228, and are connected to thermocouple 282 by leads 278 and 280. While thermocouple 282 is shown as positioned in a piercing member such as left tine 262, it is likewise contemplated that the thermocouple may be positioned in right tine 260, as would be desirable and/or known by those with ordinary skill in the art with the present disclosure before them. Temperature sensing assembly 268 detects the temperature of the food being cooked, transmits a signal to the temperature indicating display assembly and the voice synthesizer, which output the temperature reading in one or more of the manners described above, including visual display and audible output.

Of course, it is contemplated that handle 202 is readily useable with interchangeable, modular, detachable utensil heads. To this end, in another embodiment shown in FIGS. 19 and 20, utensil head comprises detachable spatula head 290, including spatula portion 292, neck 294, receiving region 296 and temperature sensing assembly 298. Spatula portion 292 is preferably constructed from metal, to make the spatula portion high in strength and temperature resistance for use on a grill or other cooking surface. However, spatula portion 292 may also comprise other materials, such as plastic. Moreover, while spatula portion 292 is shown as having a specific configuration and a specific number of elongated apertures, each of those features may be varied as would be known by those with ordinary skill in the art with the present disclosure before them.

Receiving region 296 is shown in FIGS. 19 and 20 as substantially similar to receiving region 266 described in reference to detachable fork head 202 in FIGS. 10–18. As such, receiving region 296 also includes an aperture substantially matching the shape of engagement member 242, a cavity substantially matching the shape of engagement region 236 and grooves to accept keyed regions 240 on engagement region 236 of handle 202.

Temperature sensing assembly 298 is shown in FIGS. 19 and 20 as including leads 304, temperature probe 308 and thermocouple 310. Like temperature sensing assembly 268 on detachable fork head 204, temperature sensing assembly 298 on detachable spatula head 290 also includes electrical ports, although they are not shown in the drawings. Leads 304 are shown in phantom in FIG. 20 as extending through temperature probe 308 to thermocouple 310, positioned in the tip of temperature probe 308. Like fork tines 260 and 262 which house thermocouple 282, probe 308 is capable of piercing food to sense its temperature at an interior location of the food, preferably at the approximate mid-point of its thickness, to get a true and accurate reading of the food temperature.

As can be seen from the drawings, temperature probe 308 preferably extends from neck 294 of detachable spatula head 290 and curves approximately 90° such that it extends from the outer periphery of spatula portion 292—at an approximate right angle to the vertical plane occupied by neck 294 of detachable spatula head 290. As can be seen, temperature probe 308 preferably extends from the top portion of spatula portion 292, such that it stays out of the way when a user is manipulating or transporting food on spatula portion 292. It is also contemplated that temperature probe 308 may extend from the side portions of spatula portion 292. Likewise, temperature probe 308 may also extend from the outer periphery of spatula portion 292 at other than 90° angles to still enable easy and effective sensing of food temperature. At the same time, temperature probe 308 is close enough to the food being cooked to allow easy rotation of the temperature sensing utensil 200 by 90° for insertion of temperature probe 308 into food being cooked. This allows a user to sense the temperature of food on a cooking surface, such as a grill or a stove, or in an oven, without actually having to place the piece of food onto the spatula portion. Thus, the food temperature can be sensed while the food continues to cook, without interrupting the cooking process. Moreover, the temperature probe is in a location which avoids interfering with manipulation of the food.

Of course, while temperature probe 308 is shown in the drawings as extending from the outer periphery of the spatula portion 292 at a substantially right angle to neck 294 of detachable spatula 290, it is likewise contemplated that temperature probe 308 can extend from the spatula portion at different angles, as would be known by those with ordinary skill in the art with the present disclosure before them. Likewise, temperature probe 308 may extend a shorter distance out from the periphery of spatula portion 292, or a further distance, depending on a particular design and/or use requirement.

In another alternative embodiment, the utensil head comprises a detachable probe 320, which is shown in FIGS. 21 and 22 as comprising probe 322, flexible extension 324, neck 326, receiving region 328 and temperature sensing assembly 330. Neck 326 and receiving region 328 are substantially the same as neck 294 and receiving region 296 on detachable spatula 290, as well as neck 264 and receiving region 266 on detachable fork head 204. However, temperature sensing probe 322 is connected to neck 326 by flexible extension 324. As can be seen from FIGS. 21 and 22, flexible extension 324 is preferably constructed at least in part from a wire mesh to provide flexibility, durability and strength—to allow use in a number of different environments. However, flexible extension 324 may be made from a number of other materials, as would be known by those with ordinary skill in the art with the present disclosure before them.

Temperature sensing assembly 330, like temperature sensing assembly 298 in spatula head 290 and temperature sensing assembly 268 in fork head 204, includes thermocouple 332 positioned in the bottom tip of food-piercing probe 322, as well as leads 334 extending from electrical ports (not shown) in receiving region 328 through both flexible extension 324 and probe 322. Flexible extension 324 is preferably heat resistant, to withstand grilling and/or oven temperatures. As such, probe 322 may be placed into food contained in an oven, such as a whole chicken or a whole turkey, while allowing flexible extension 324 to be shut inside of the oven door, leaving a portion of flexible extension 324, neck 326 and receiving region 328 outside of the oven. This allows a user to periodically attach receiving region 328 of detachable probe 320 to engagement region 336 of handle 202, to sense the temperature of the food being cooked at various intervals. Likewise, the same arrangement can be made with food being cooked on either an open or closed grill. This even allows handle 202 to be used with another one of the modular detachable heads, such as fork head 204 or spatula head 290, for simultaneous cooking operations.

The foregoing description and drawings merely explain and illustrate the invention and the invention is not limited thereto except insofar as the appended claims are limited as those skilled in the art who have the present disclosure before them will be able to make modifications and variations without departing from the scope of the invention.

What is claimed is:

1. A utensil for sensing the temperature of food comprising:
 a handle including an engagement region and a temperature indicating display assembly, said engagement region having at least one engagement member operably moveable between locking and release orientations; and a plurality of modular, interchangeable heads which are both attachable to and detachable from the handle, each of said heads including a receiving region and a temperature sensing assembly, said temperature sensing assembly being operably and electrically attachable to said temperature indicating display assembly associated with said handle, said receiving region having at least one receiving member for releasably receiving said engagement member, whereby positioning of said engagement member in a locking orientation relative to said receiving member secures a head selected from said plurality of modular, interchangeable heads to said handle, while maintaining an electrical connection circuit therebetween, and whereby moving said engagement member to a release orientation permits detachment of a selected head from said handle and simultaneous disconnection of said electrical circuit.

2. The temperature sensing utensil according to claim 1 wherein the temperature sensing assembly of at least one of the plurality of modular, interchangeable heads includes a piercing member capable of being inserted into said food for sensing the temperature of the food at an internal location thereof.

3. The temperature sensing utensil according to claim 1 wherein the temperature sensing assembly of each of the plurality of modular, interchangeable heads includes a piercing member capable of being inserted into said food for sensing the temperature of the food at an internal location thereof.

4. The temperature sensing utensil according to claim 1 wherein at least one of the plurality of modular, interchangeable heads includes a food utensil member for manipulating food.

5. The temperature sensing utensil according to claim 1 wherein at least one of the plurality of modular, interchangeable heads includes a fork portion having at least two tines.

6. The temperature sensing utensil according to claim 1 wherein at least one of the plurality of modular, interchangeable heads includes a spatula portion having an outer periphery.

7. The temperature sensing utensil according to claim 6 wherein the spatula portion includes a temperature sensing probe.

8. The temperature sensing utensil according to claim 7 wherein the temperature sensing probe extends from the outer periphery of the spatula portion.

9. The temperature sensing utensil according to claim 8 wherein the spatula portion further includes a top portion, a bottom portion and two side portions, and wherein the temperature sensing probe extends from at least one of the top portion and two side portions.

10. The temperatures sensing utensil according to claim 8 wherein the temperature sensing probe is oriented substantially orthogonally to the spatula portion.

11. The temperature sensing utensil according to claim 8 wherein the spatula portion extends downward from the handle in a substantially vertical plane, and wherein the temperature sensing probe extends from the outer periphery of the spatula in a substantially horizontal plane.

12. The temperature sensing utensil according to claim 6 wherein said spatula portion is constructed at least in part from a metal material.

13. The temperature sensing utensil according to claim 1 wherein at least one of the plurality of modular, interchangeable heads includes a temperature sensing probe connected to said at least one head by a flexible extension member.

14. The temperature sensing utensil according to claim 13 wherein said flexible extension member includes a wire mesh.

15. The temperature sensing utensil according to claim 1 wherein said engagement member includes at least one detent operably depressible for movement from said locking orientation to said release orientation.

16. The temperature sensing utensil according to claim 15 wherein said at least one detent is biased to said locking orientation.

17. The temperature sensing utensil according to claim 16 wherein said at least one detent is biased to a locking orientation by a spring positioned within said engagement region.

18. The temperature sensing utensil according to claim 1 wherein said receiving member includes at least two opposing walls defining a retaining region, at least one of said at least two opposing walls including at least one aperture alignable, in said locking orientation, with said at least one engagement member.

19. The temperature sensing utensil according to claim 18 wherein said at least one aperture is configured to telescopically receive at least a portion of said at least one engagement member to facilitate locking of each of said plurality of modular, interchangeable heads relative to said handle.

20. The temperature sensing utensil according to claim 1 wherein said engagement member further includes at least one of an engagement key and an engagement slot, said receiving member including the other of said engagement key and said engagement slot, such that said at least one engagement key matingly engages said at least one engagement slot to facilitate attachment of said modular, interchangeable heads to said handle, while controlling the connection orientation of said electrical circuit to preserve uniform plurality.

21. The temperature sensing utensil according to claim 1 wherein said handle further includes a voice synthesizer for converting a temperature reading by said temperature sensing assembly into audible output from the temperature sensing utensil.

22. The temperature sensing utensil according to claim 21 wherein the voice synthesizer generates audible output in the form of at least one of the temperature of food being cooked and the corresponding doneness of the food being cooked.

23. The temperature sensing utensil according to claim 22 wherein the voice synthesizer generates audible output through a human voice recording, and wherein the temperature sensing utensil further includes a switch accessible on the exterior of the temperature sensing utensil which allows a user to select the language of the human voice recording from a plurality of languages.

24. The temperature sensing utensil according to claim 1 wherein the handle further includes a contoured portion which guides a user's hand to a grip enhancing region.

25. The temperature sensing utensil according to claim 24 wherein said temperature indicating display assembly includes a temperature display positioned proximate to but away from the grip enhancing region to allow the temperature display to remain in substantially unobstructed view without altering a user's gripping orientation on the temperature sensing utensil.

26. The temperature sensing utensil according to claim 25 wherein the grip enhancing region is positioned proximate a top end of the handle, while the temperature display is positioned proximate a bottom end of the handle.

27. A utensil for sensing the temperature of food comprising:
- a handle including a temperature indicating display assembly;
- a spatula head extending from the handle, said spatula head including an outer periphery and a temperature sensing assembly connected to the temperature indicating display assembly electrically associated with the handle;
- said temperature sensing assembly including a temperature sensing probe capable of insertion into said food for sensing the temperature of the food at an internal location thereof,
- said temperature sensing probe extending from the spatula head such that the temperature sensing probe may be inserted into said food and a temperature reading taken without altering the position of the food relative to its cooking environment.

28. The temperature sensing utensil according to claim 27 wherein the temperature sensing probe extends from the outer periphery of the spatula portion.

29. The temperature sensing utensil according to claim 28 wherein the spatula head further includes a top portion, a bottom portion and two side portions, and wherein the temperature sensing probe extends from at least one of the top portion and two side portions.

30. The temperature sensing utensil according to claim 29 wherein the temperature sensing probe extends outwardly from the top portion of the spatula head.

31. The temperatures sensing utensil according to claim 28 wherein the temperature sensing probe is oriented substantially orthogonally to the spatula head.

32. The temperature sensing utensil according to claim 28 wherein the spatula head extends downward from the handle in a substantially vertical plane, and wherein the temperature sensing probe extends from the outer periphery of the spatula in a substantially horizontal plane.

33. The temperature sensing utensil according to claim 27 wherein the spatula head is releasably lockable to the handle to allow for attachment to and detachment of the spatula head from the handle.

* * * * *